United States Patent
Borel et al.

(10) Patent No.: US 8,068,945 B2
(45) Date of Patent: Nov. 29, 2011

(54) METHOD FOR HOMOGENIZING MEASUREMENT UNITS USED FOR DISPLAYING COMMUNICATION MESSAGES

(75) Inventors: Matthieu Borel, Toulouse (FR); Nicolas Rossi, Toulouse (FR); Michel Subelet, Cugnaux (FR)

(73) Assignee: Thales (FR)

( * ) Notice: Subject to any disclaimer, the term of this patent is extended or adjusted under 35 U.S.C. 154(b) by 939 days.

(21) Appl. No.: 12/065,638

(22) PCT Filed: Jul. 28, 2006

(86) PCT No.: PCT/EP2006/064799
§ 371 (c)(1),
(2), (4) Date: Mar. 4, 2008

(87) PCT Pub. No.: WO2007/028675
PCT Pub. Date: Mar. 15, 2007

(65) Prior Publication Data
US 2008/0208795 A1 Aug. 28, 2008

(30) Foreign Application Priority Data
Sep. 6, 2005 (FR) ...................................... 05 09096

(51) Int. Cl.
*G07F 7/00* (2006.01)

(52) U.S. Cl. ......................................................... 701/14
(58) Field of Classification Search ................ 701/1, 14; 340/945
See application file for complete search history.

(56) References Cited

U.S. PATENT DOCUMENTS

| 4,604,711 A | 8/1986 | Benn et al. |
| 5,313,396 A | 5/1994 | Terpstra et al. |
| 6,163,743 A | 12/2000 | Bomans et al. |
| 6,272,477 B1 * | 8/2001 | Kelly et al. ........................ 706/5 |
| 2003/0088342 A1 | 5/2003 | Godard et al. |

* cited by examiner

*Primary Examiner* — Yonel Beaulieu
(74) *Attorney, Agent, or Firm* — Lowe Hauptman Ham & Berner, LLP

(57) ABSTRACT

The present invention relates to a method for homogenizing measurement units used for displaying communication messages containing numerical data notably messages exchanged by an aircraft with the air traffic control authority. The choice of the working units of the flight management computer are recovered in the configuration database. The measurement unit of the numerical data item of the displayed message is determined. When the measurement unit of the numerical data item of the message does not form part of the system of measurement units, the numerical data item is connected into a unit forming part of the system of units. The display of the communication message on the onboard screen is formatted.

8 Claims, 2 Drawing Sheets

METHOD FOR HOMOGENIZING MEASUREMENT UNITS USED FOR DISPLAYING COMMUNICATION MESSAGES

CROSS-REFERENCE TO RELATED APPLICATIONS

The present Application is based on International Application No. PCT/EP2006/064799, filed on Jul. 28, 2006, which in turn corresponds to French Application No. 05 09096, filed on Sep. 6, 2005, and priority is hereby claimed under 35 USC §119 based on these applications. Each of these applications are hereby incorporated by reference in their entirety into the present application.

FIELD OF THE INVENTION

The present invention relates to a method for homogenizing measurement units used for displaying communication messages containing numerical data notably messages exchanged by an aircraft with the air traffic control authority.

BACKGROUND OF THE INVENTION

To cope with the growth in air traffic and improve the safety thereof, the aeronautical authorities represented by the ICAO (acronym standing for International Civil Aeronautical Organization) have defined precise recommendations relating to improvements in communication services within the framework of the future ATN (Aeronautical Telecommunication Network) civil aeronautical communication network and the implementation of future air traffic management or ATC (Air Traffic Control) applications. ATC communication systems are based on onboard/ground information exchanges, the aim of which is to ensure a secure and effective link between pilots and air traffic controllers.

Among the various applications specified by the ICAO (International Civil Aeronautical Organization) on the ATN network, one of them, the CPDLC (Controller Pilot Data Link Communication) allows the exchange of digital traffic control messages between the pilot and the air traffic control authority.

Moreover the large majority of aircraft are provided with a flight management computer (also called Flight Management or FM) whose job is to calculate the position and the attitude of the craft as well as to calculate and optimize the trajectory of the aircraft so as to follow the envisaged flight plan. This computer is parameterized according to the options chosen by each airline, notably as regards the measurement units to be used for the altitude and speed data.

The phraseology of the CPDLC messages exchanged with an air traffic control authority is standardized. For example, when the air traffic controller requests a change of altitude from the pilot, he does it with a CPDLC message of the type "CLIMB at LEVEL XXX" where XXX is a numerical data item which represents the desired altitude. This numerical data item can equally well be expressed by the controller in feet or in meters. The same holds for the data exchanges relating to a speed (expressed in kilometers per hour or in knots), a pressure (expressed in hectopascals or in inches of Mercury) or else a distance (expressed in nautical miles or in kilometers). The unit of the numerical data item is mentioned in the CPDLC message and is displayed on a screen of the flight deck. Nevertheless, the fact that it can differ from that parameterized in the flight management computer compels the pilot to verify the measurement unit of a numerical setpoint of a CPDLC message before being taken into account by the flight management system. Nevertheless, the communication of a numerical data item expressed in a unit which differs from those used by the flight management computer complicates the work of the pilot when the data item is transmitted to the computer. In some circumstance, this complication may give rise to errors in the value of the numerical data transmitted to the flight management computer and may entail extremely serious consequences for the life of the occupants of the aircraft.

SUMMARY OF THE INVENTION

An important aim of the invention is to alleviate this drawback.

To achieve this aim, the invention proposes a method for homogenizing the measurement units of a numerical data item included in a communication message displayed on an onboard screen of an aircraft equipped with a flight management computer operating in a pre-established system of measurement units being stored in a configuration database.

The choice of the working units of the flight management computer are recovered in the configuration database.

The measurement unit of the numerical data item of the displayed message is determined.

When the measurement unit of the numerical data item of the message does not form part of the system of measurement units, the numerical data item is connected into a unit forming part of the system of units.

The display of the communication message on the onboard screen is formatted.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENTS

Figure 1:
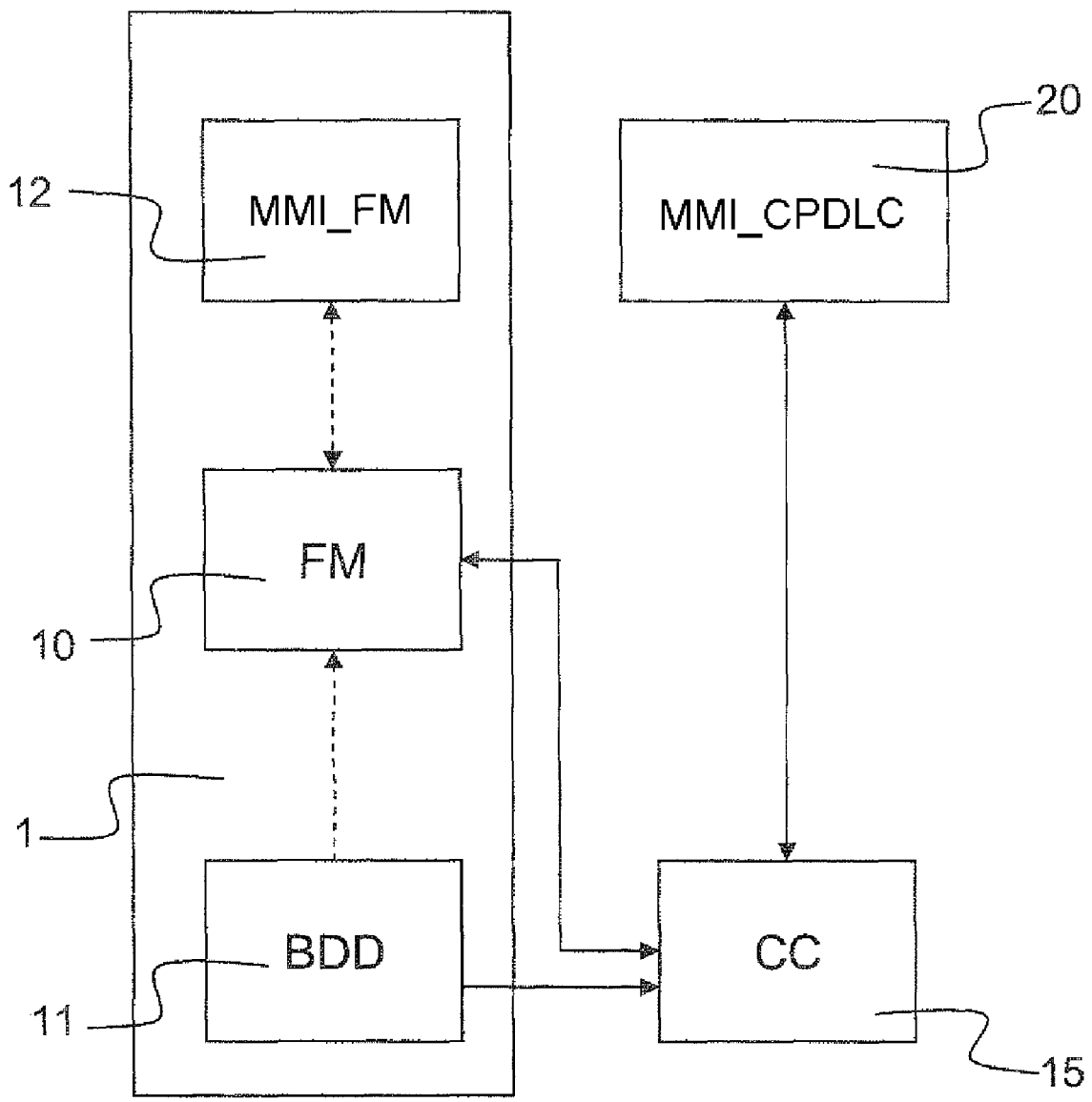
FIG. 1 represents the architecture of the aerial part of an ATN aeronautical telecommunication network.

FIG. 1 schematically represents a flight management system 1, a communications computer CC, 15, and a man-machine interface MMI_CPDLC 20, these three entities being carried onboard one and the same aircraft.

The flight management system 1 comprises:
a flight management computer FM, 10;
a configuration database BDD, 11;
a man-machine interface of the flight management computer MMI_FM, 12.

The flight management computer FM determines the situation of the aircraft (position and altitude) on the basis of information delivered by sensors carried onboard the aircraft (GPS and probes, etc.) in the form of numerical data; it guides the aircraft and optimizes its trajectory so as to follow a flight plan. To modify the flight plan, it takes into account the pilot's orders.

The configuration database BDD contains the flight plan which has been loaded prior to the flight and a configuration grouping together a certain number of data items of parameters useful to the flight management computer FM so that it can carry out the calculations for determining situation, guidance, and optimization as well as a measurement unit system, consisting of a one-to-one association between a physical quantity and a measurement unit. For example for the quantity "distance" the measurement unit which may be associated therewith is the nautical mile or the kilometer, for the quantity "speed", it is possible to associate therewith the knot or else the kilometer per hour, etc.

The choice of the measurement unit system defines the measurement unit that the flight management computer FM assigns to the data item of a quantity which is transmitted to it by the pilot. For example, if the pilot chooses to transmit to the computer a distance in the form of the numerical data item 3, the computer will interpret the data item as "3 km" or else as "3 nautical miles" depending on the measurement unit system present in the configuration. The configuration is chosen by the company operating the aircraft and the choice of the working units is in general a reflection of the national culture of the country of origin of the company. The configuration database BDD is modified periodically so as to update the flight plan. The choice of the working units is very rarely modified by the companies.

The interface MMI_FM comprises a first onboard screen which makes it possible to display the communication messages originating from the flight management computer FM which the pilot requires in order to direct his aircraft. This interface also serves the pilot for transmitting a possible modification of the current flight plan to the computer FM. The origin of this modification may be a communication message from the air traffic control authority on the ground instructing for example the pilot to change flight level.

Advantageously, the communication message displayed is sent by an air traffic control authority located on the ground.

The modifications of the flight plan are transmitted to the computer FM in the form of a digital message whose phraseology and syntax are formatted. The message is composed in general of an action expressed in the form of an alphabetic character string followed by a numerical data item representing the setpoint value of a quantity. A message has for example the following form: "CLIMB at LEVEL XXX" where XXX is a numerical data item representing a flight level. The computer interprets the numerical data item as a value expressed in the measurement unit associated with the quantity in the choice of working units.

The interface MMI_CPDLC is dedicated to CPDLC communication between the aircraft and a communication station on the ground. It allows the pilot to formulate communication messages bound for the air traffic control authority. The interface MMI_CPDLC comprises a second onboard screen which makes it possible to display communication messages sent by the air traffic control authority, destined for the pilot. The digital messages sent by the air traffic control authority or else destined for the air traffic control authority travel via the communications computer CC.

According to the invention, the communications computer CC recovers the configuration stored in the configuration database BDD. Subsequently, for each receipt of a message sent by the air traffic control authority comprising a numerical data item, the communications computer CC determines the unit in which the numerical data item is expressed. Depending on whether or not the unit of the message received is that defined in the configuration, the communications computer CC does or does not convert the numerical data item into the working unit.

The communications computer CC formats the digital message sent by the air traffic control authority with a view to its display on the man-machine interface 20.

Advantageously, the measurement unit of the numerical data item of the displayed message does not form part of the system of measurement units, in displaying on the onboard screen an associated communication message, comprising the numerical data item expressed in a unit forming part of the system of measurement units.

Figure 2:
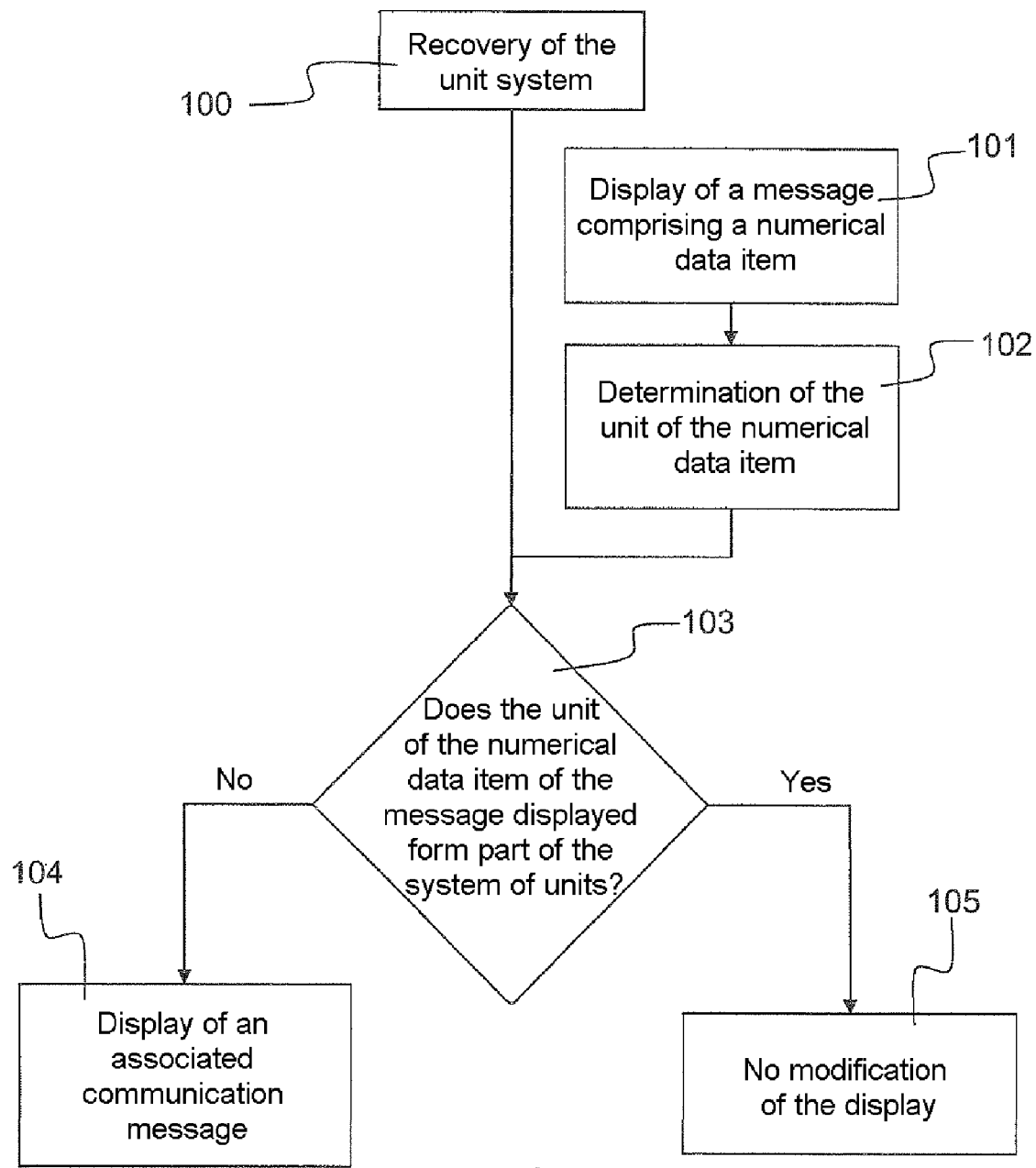
FIG. 2 represents a flowchart of the measurement unit homogenization method according to the invention.

FIG. 2 represents a flowchart of the method according to the invention. A first step 100 of the method consists of the recovery by the communications computer CC of the measurement unit system stored in the configuration database.

Advantageously, the recovery of the choice of the working units of the flight management computer in the configuration database is carried out during the initialization of the communications of the aircraft.

A second step, 101 of the method consists of displaying a communication message comprising a numerical data item on an onboard screen of the aircraft.

A third step, 102 of the method consists of the determination by the communication computer CC of the measurement unit in which the numerical data item of the displayed message is expressed.

A fourth step, 103 of the method consists of the determination of the membership in the system of measurement units of the measurement unit of the numerical data item of the message displayed.

When the measurement unit of the numerical data item of the displayed message forms part of the system of measurement units, the following step 105 consists in not modifying the display on the onboard screen.

When the measurement unit of the numerical data item of the displayed message does not form part of the system of measurement units, the following step 106 consists in displaying on the onboard screen an associated communication message, comprising the numerical data item expressed in a unit forming part of the system of measurement units.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for homogenizing measurement units of a numerical data item included in a communication message displayed on an onboard screen of an aircraft equipped with a flight management computer operating in a pre-established system of measurement units being stored in a configuration database, comprising the following steps:
   recovering in the configuration database a choice of working units of the flight management computer;
   determining a measurement unit of the numerical data item of the displayed communication message;
   when the determined measurement unit of the numerical data item of the displayed communication message does not form a part of the pre-established system of measurement units, converting the numerical data item into a unit forming a part of the pre-established system of measurement units;

formatting the communication message; and displaying the formatted communication message on the onboard screen of the aircraft.

2. The method as claimed in claim 1, wherein the displayed communication message is sent by an air traffic control authority located on the ground.

3. The method as claimed in claim 1 wherein the recovery of the choice of the working units of the flight management computer in the configuration database is carried out during the initialization of the communications of the aircraft.

4. The method as claimed in claim 1 wherein the displaying comprises, when the measurement unit of the numerical data item included in the displayed communication message does not form a part of the pre-established system of measurement units, displaying on the onboard screen an associated communication message, the associated communication message comprising the numerical data item expressed in a unit forming a part of the pre-established system of measurement units.

5. The method as claimed in claim 1, wherein the choice of the working units defines the measurement units in the pre-established system of measurement units.

6. The method as claimed in claim 5, wherein a corresponding one among the defined measurement units is assigned to the numerical data item.

7. The method as claimed in claim 2, wherein the recovering, the determining, the converting, and the formatting are performed by a communications computer, the communication computer receiving the communication message sent by the air traffic control authority.

8. A method for homogenizing measurement units of a numerical data item included in a communication message displayed on an onboard screen of an aircraft equipped with a flight management computer operating in a pre-established system of measurement units being stored in a configuration database, comprising:

recovering a choice of working units of the flight management computer in the configuration database;

determining a measurement unit of the numerical data item of the displayed communication message;

when the determined measurement unit of the numerical data item of the displayed communication message is not defined in the pre-established system of measurement units, converting the determined measurement unit of the numerical data item into a corresponding working unit among the working units defined in the pre-established system of measurement units;

formatting the communication message including the numerical data item, the numerical data item having the converted corresponding working unit; and displaying the formatted communication message on the onboard screen of the aircraft.

* * * * *